March 3, 1970  R. A. BRAUNBERGER  3,498,635
SLIDING FIFTH WHEELS
Filed Sept. 3, 1968

INVENTOR.
RAY A. BRAUNBERGER
BY
Bruno C. Lechler
ATTORNEY

United States Patent Office 3,498,635
Patented Mar. 3, 1970

3,498,635
SLIDING FIFTH WHEELS
Ray A. Braunberger, 221 N. La Salle St.,
Chicago, Ill. 60601
Filed Sept. 3, 1968, Ser. No. 756,991
Int. Cl. B62d 53/10
U.S. Cl. 280—407                                    1 Claim

ABSTRACT OF THE DISCLOSURE

A fifth wheel device for tractor-trailers whose position on the chassis of the vehicle is slidably adjustable longitudinally thereof. The device includes two parallel rails mounted on the chassis, two fifth wheel trunnions, each slidable on a respective one of said rails, a platform between the trunnions and flexibly connected thereto, plungers for locking each trunnion to its rails in a selected position, and mechanism supported on the platform to actuate the plungers.

---

Fifth wheels of the type described and shown in Patent No. 3,030,125 have frequently broken down, the platform breaking away from the trunnion despite the fact that the platform in actual travel along the highway should be subject to no strain other than the light weight of the plunger adjusting mechanism.

Apparently the top of the chassis, as the semi-trailer moves over irregular roads, is subject to distortion and vibration. As a result, the two rails do not remain in precisely the same plane, there is a small movement of one trunnion relative to the other transmitted from the rails, and the fatigue stress on the platform, rigidly attached to the trunnions, causes the platform to break.

The object of the invention is to provide a platform connected to the trunnions in a manner that assures that the trunnions move along the rails in unison and which is flexible connected to prevent damage by other strains transmitted to it when passing along the highway.

Figure 1:
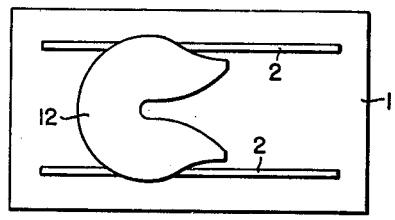
FIGURE 1 shows, in plan the fifth wheel carried on the top of the chassis of a semi-trailer.
Figure 2:
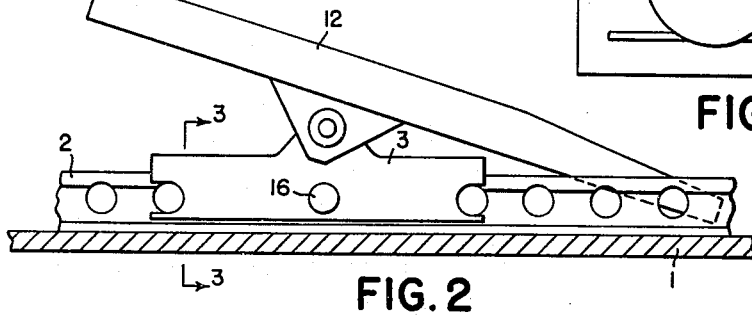
FIGURE 2 shows, in elevation, on a larger scale the fifth wheel, the trunnions, and the rails attached to the top of the tractor chassis.
Figure 3:
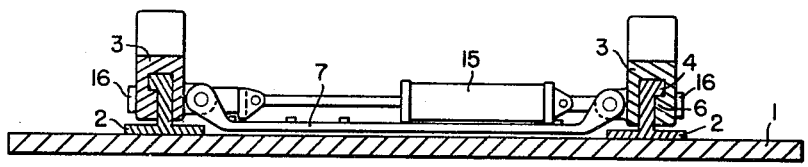
FIGURE 3 shows, in elevation, a section taken along lines 3—3 in FIGURE 2.
Figure 4:
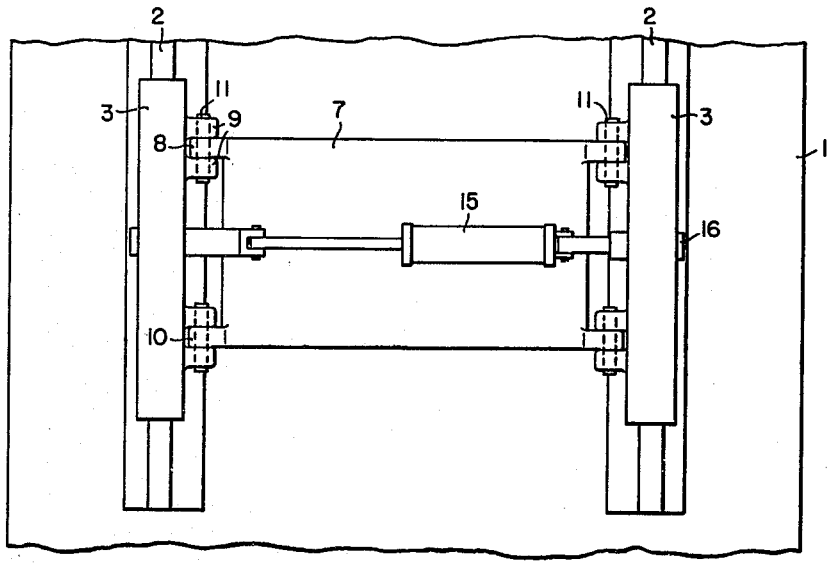
FIGURE 4 is a top view of the structure shown in FIGURE 3.

1 represents the top of the chassis of the semi-trailer that supports rails 2. Trunnions 3, mounted on the rails, have flanges 6 engaging flanges 4 on the rails to assure that the rail and the trunnion remain in contact at all times. A platform 7 has projections 8 and 10, some distance apart, that extend between projections 9 on the trunnions. Bolts 11 extending thru holes in said projections, assure that the two trunnions move equal distances along their respective rails.

The fifth wheel plate 12 that carries the front end of a trailer, is carried by the trunnions 3.

The platform carries equiment 15 of the type described in Patent 3,030,125 that actuates plungers 16 that pass thru holes in rails 2 and trunnions 3 to lock the trunnion to the rail after the trunnion has been placed in the selected position on the rails.

When the tractor, moving along an uneven roadway, causes the chassis platform 1 to distort, the two trunnions may move with the rails slightly relative to each other, but the vibrations are not transmitted to the platform and there is no fatigue of the platform.

I claim:
1. A sliding fifth wheel comprising, two parallel rails attached to the top of the platform of a semi-trailer, a trunnion slidable on each rail, a single platform, means flexibly connecting said trunnions to said platform in a manner assuring that each trunnion moves a comparable distance along its rails but permitting vibration of one trunnion relative to the other, plungers adapted to lock each trunnion to its rail; mechanism to actuate said plungers carried by said platform.

References Cited
UNITED STATES PATENTS

| 2,985,463 | 5/1961 | Geerds | 280—407 |
| 3,030,125 | 4/1962 | Braunberger | 280—407 |
| 3,339,941 | 9/1967 | Braunberger | 280—407 |

LEO FRIAGLIA, Primary Examiner